May 30, 1967 W. J. JOHNSON 3,322,203
HARROW DEVICE
Filed July 20, 1966 4 Sheets-Sheet 1
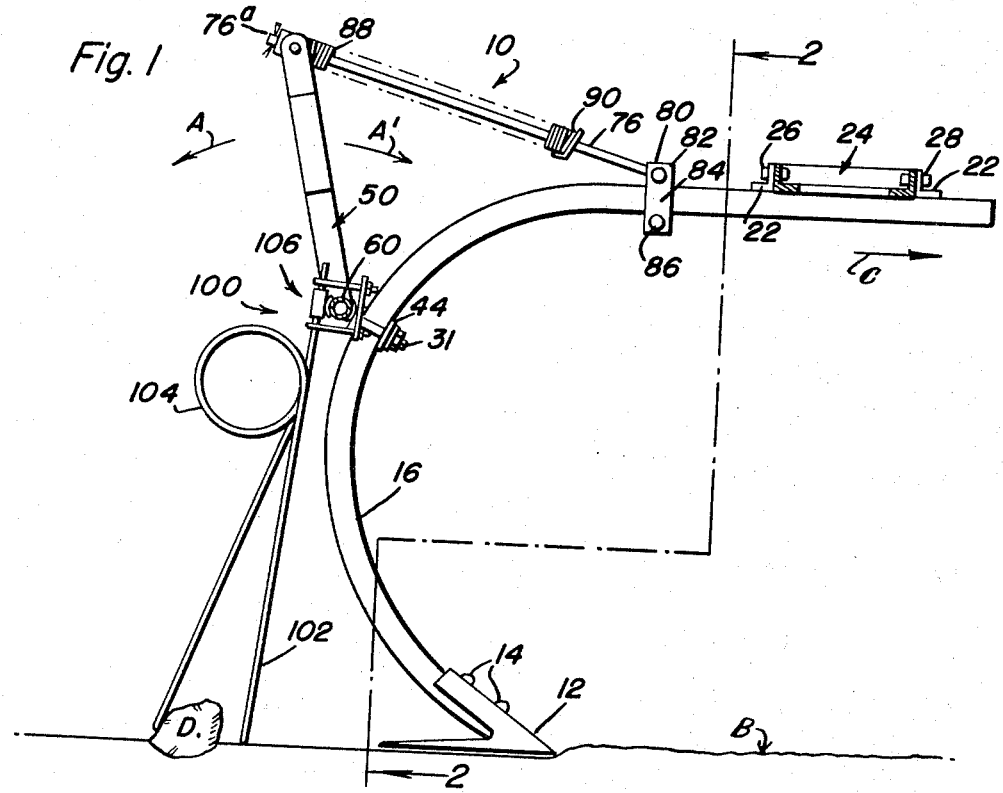
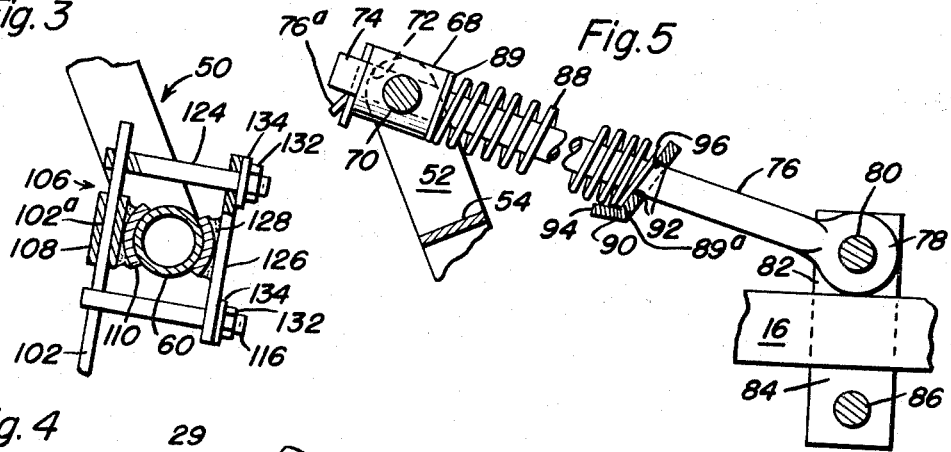
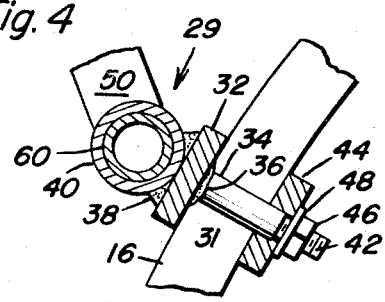
INVENTOR
Wendell J. Johnson
BY John A. Mawhinney
ATTORNEY May 30, 1967  W. J. JOHNSON  3,322,203
HARROW DEVICE
Filed July 20, 1966  4 Sheets-Sheet 2
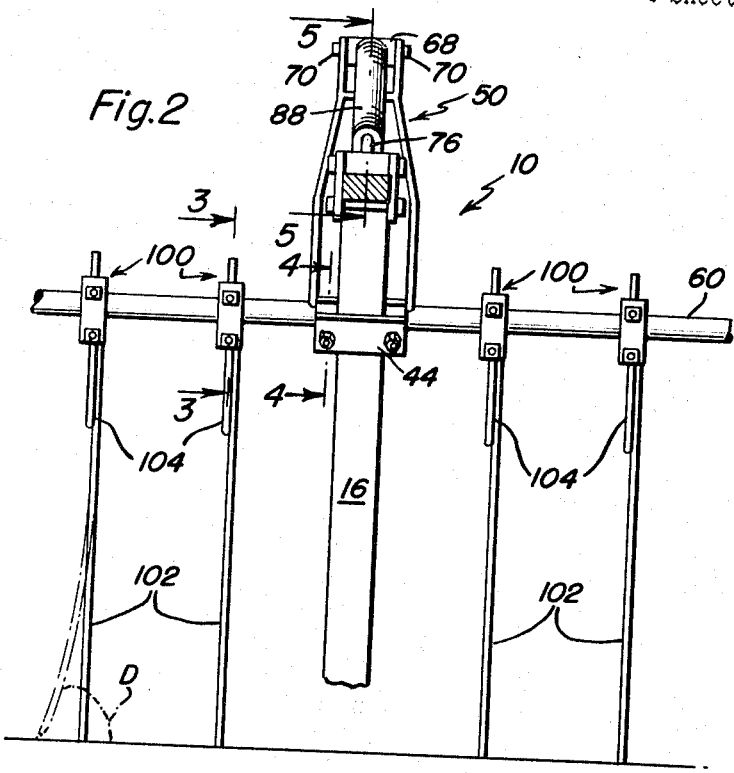
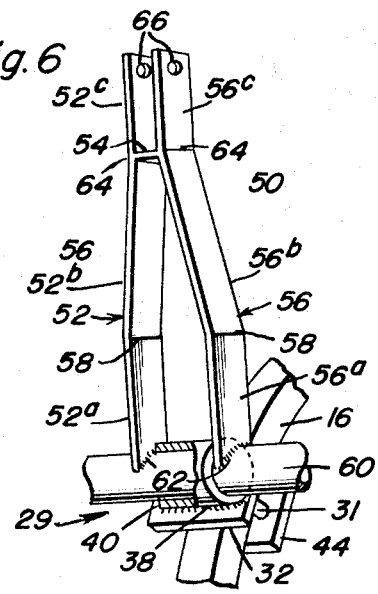
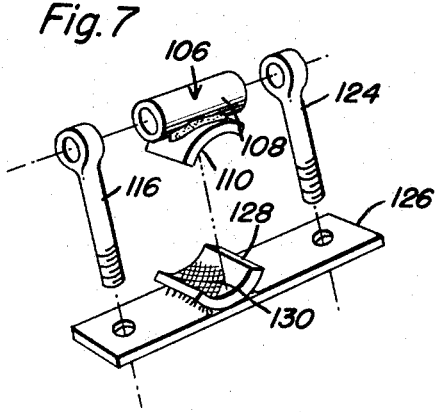
INVENTOR
Wendell J. Johnson
BY John A. Mawhinney
ATTORNEY May 30, 1967 W. J. JOHNSON 3,322,203
HARROW DEVICE
Filed July 20, 1966 4 Sheets-Sheet 3
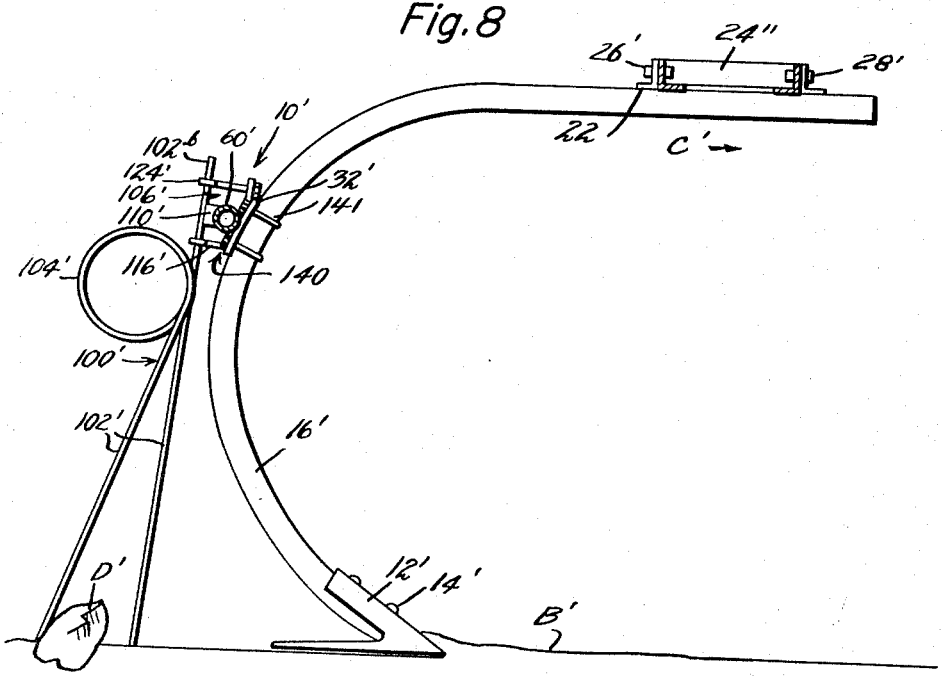
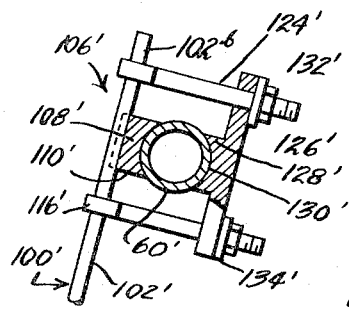
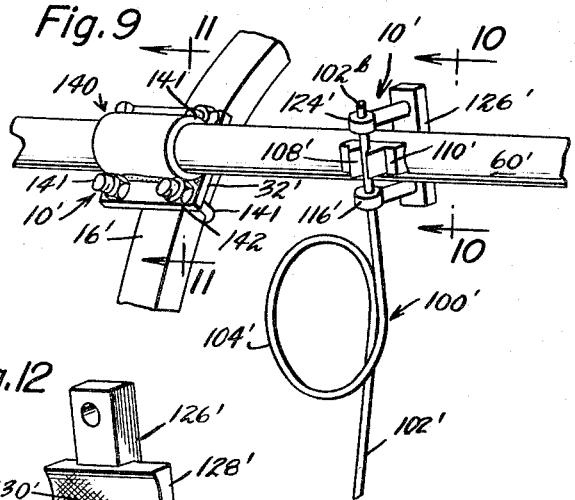
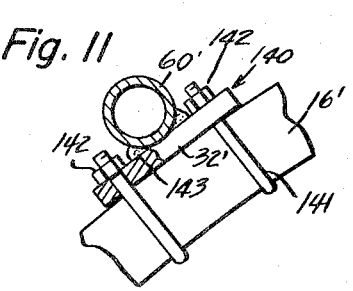
INVENTOR
Wendell J. Johnson
BY John A. Mawhinney
ATTORNEY May 30, 1967  W. J. JOHNSON  3,322,203
HARROW DEVICE
Filed July 20, 1966  4 Sheets-Sheet 4
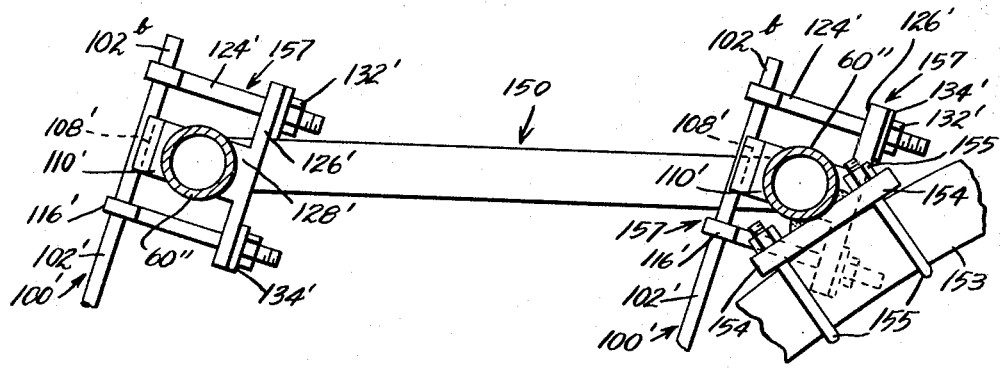
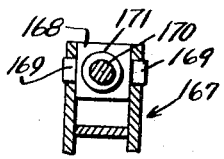
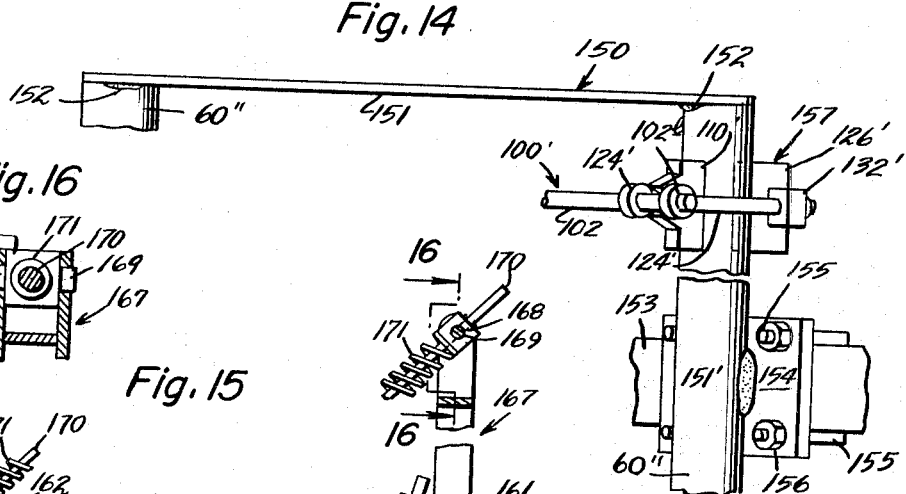
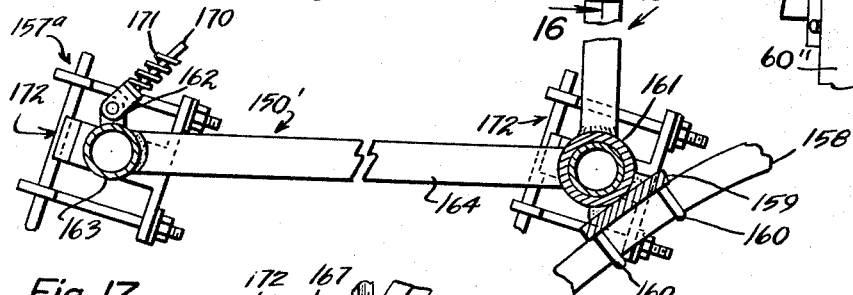
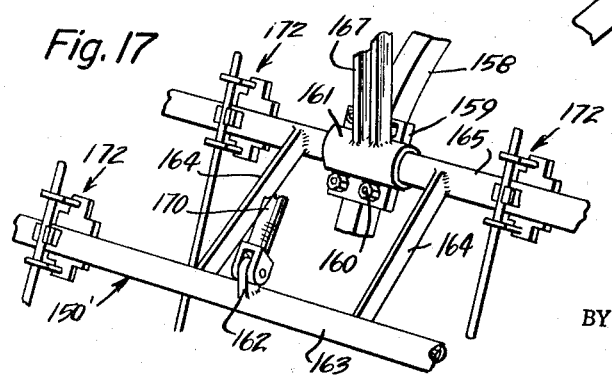
INVENTOR
Wendell J. Johnson
BY John A. Mackurney
ATTORNEY

United States Patent Office 3,322,203
Patented May 30, 1967

3,322,203
HARROW DEVICE
Wendell J. Johnson, Corinth, N. Dak. 58841
Filed July 20, 1966, Ser. No. 572,869
15 Claims. (Cl. 172—142)

The present invention relates to a harrow device adapted to be used on heavy duty cultivators, height clearance cultivators, or chisel plows and has for an object to provide a device of this character which has the very beneficial effect of harrowing and leveling the ground.

This application is a continuation-in-part of my application for patent for a harrow device Ser. No. 392,082, filed Aug. 26, 1964, now abandoned.

The referred to types of cultivators are used in fields where there is a considerable amount of straw and trash on the ground that must be spread and worked into the ground and the device of the present invention accomplishes the spreading of the straw or trash and is used to fill partially the deep furrows that are left by the large wide shovels which are used on this type of cultivator or chisel plow. The present invention may also be used for spreading the straw or trash that remains after a conventional combine has passed over the ground and is particularly useful in the large grain producing areas of the United States.

An object of the present invention is to provide a harrow device comprising a plurality of teeth, each of which is inherently elastic or resilient so that when an obstacle is encountered the tooth will be deflected rearwardly or laterally so that it can pass over the obstacle without damage to the tooth and due to its inherent resiliency the tooth will return to its original working position as soon as the obstacle has been passed over.

It is a further object of the present invention to supplement the inherent resiliency of each tooth by mounting the teeth on the cultivator or chisel plow by resilient means which will usually resiliently bias the teeth to engage or penetrate the soil which will permit the teeth to be further deflected when an obstacle of such a size is encountered that the inherent resiliency of the tooth will not be sufficient to permit sufficient deflection of the tooth to pass over the obstacle. In this case the additional resilient means will permit a movement of translation of the entire tooth to supplement the more or less local movement of the tooth so that larger obstacles can be passed over without damage to the tooth and the resilient means will then restore or return the tooth to its original working condition.

The present invention contemplates the provision of co-operating means on the shank on the chisel plow and the tool bar which supports the teeth for adjusting both the angle of attack of the working portion of each tooth but also the vertical height of the teeth with respect to the earth being worked. This means constitutes a rough adjustment of the angle of attack and the vertical height of the teeth.

In conjunction with and supplemental to these rough adjustment means, the present invention also contemplates the provision of a fine adjustment means for the angle of attack and the vertical height of each tooth with respect to the ground being worked. This means permits the independent adjustment of each tooth.

A further aim is to provide constructions wherein the pressure spring means for biasing the harrow into engagement with the soil in one form may be attached to the plow or equivalent shank and in another form may be attached to the tool bar mounting means.

Another object is to provide forms in which the invention is practical with the employment of tool bars for the harrow assemblies arranged in parallel or otherwise in pluralities.

It will be noted that in the practice of the different forms of the invention and is shown in the drawings as applied to one or more of the shanks of a chisel plow, that no change of the structure of the shank of the chisel plow or equivalent is required.

With the foregoing and other objects in view, the invention will be hereinafter more fully described and more particularly pointed out in the appended claims.

In the drawings:

FIGURE 1 is a side elevational view of one intermediate assembly of a plurality of assemblies constructed in accordance with the present invention.

FIGURE 2 is a vertical sectional view taken on the line 2—2 of FIGURE 1,

FIGURE 3 is a vertical sectional view taken on the line 3—3 of FIGURE 2,

FIGURE 4 is a vertical sectional view taken on the line 4—4 of FIGURE 2,

FIGURE 5 is a vertical sectional view taken on the line 5—5 of FIGURE 2,

FIGURE 6 is a perspective view showing the yoke and bearing assembly,

FIGURE 7 is an exploded perspective view of the tooth holder structure,

FIGURE 8 is a side elevational view of one intermediate assembly of a plurality of assemblies of a second or modified form constructed in accordance with the invention, FIGURE 9 is a perspective view detailing the mounting and connection of the tool bar to at least one cultivator shank and a harrow tooth to the latter, FIGURE 10 is a detailed section taken on the line 10—10 of FIGURE 9, FIGURE 11 is a detailed section taken on line 11—11 of FIGURE 9, FIGURE 12 is a detailed perspective of the tooth holder plate, FIGURE 13 is a cross-sectional view of a further form of the invention wherein a unitary assembly of tool bars is used, FIGURE 14 is a fragmentary plan view of the parts of FIGURE 13, FIGURE 15 is a side elevational view of a further modified intermediate assembly using a plurality of tool bars, FIGURE 16 is a cross-section on line 16—16 of FIGURE 15, and FIGURE 17 is a detailed fragmentary perspective view of major parts of the form of FIGURE 15.

Referring now to the drawings in detail, it will be noted, particularly from FIGURES 1 and 2, that only one of a plurality of harrow implement assemblies 10 is illustrated, said harrow implement assembly comprising a conventional chisel plow 12 adjustably attached by bolts 14 to the convexly curved portion of a chisel plow shank 16 having a pair of short angle irons 22 of the same width as the chisel plow 16 welded thereto to be received by a conventional rectangular angle iron frame 24, as shown in FIGURE 1, and attached thereto by means of bolts 26 and 28. The frame 24 is in turn attached in the conventional manner to the conventional draw bar mechanism and hydraulic lift mechanism, not shown, of any suitable tractor.

Referring now to FIGURES 4 and 6 of the drawings, a tool bar mounting means or yoke and bearing assembly designated at 29 is adjustably attached to the chisel plow shank 16 by means of a pair of stud bolts 31 one on each side of the shank and each secured at one end 34 to a top plate 32 as by welding 36. The plate 32 is in turn welded as at 38 to a bearing sleeve 40. On the opposite threaded ends 42 of the bolts 31 is positioned an anchor plate 44 having suitable openings therein for receiving the bolts 31. By tightening on nuts 46 bearing against washers 48, the anchor plate 44 and the top plate 32 are secured frictionally against the opposite surfaces of the plow shank 16 thereby setting up a wedge type clamping of the bearing assembly 29 at a predetermined position on the plow shank 16.

An integrally cast, forged or fabricated yoke 50 comprised of a pair of spaced apart legs 52 and 56 joined by a web 54 straddles the bearing sleeve 40. The legs 52 and 56 comprise inner spaced apart parallel portions 52a and 56a which at their free ends are secured by welding or the like to a tool bar 60 as at 62 so that the leg portions 52a and 56a receive therebetween the bearing sleeve 40. The legs 52 and 56 also comprise intermediate converging portions 52b and 56b which converge from the points 58 outwardly to the web 54 and parallel spaced apart outer portions 52c and 56c which are apertured at 66 and receive therebetween a cylindrical swivel block 68 by means of trunnions 70 formed on said block. The cylindrical block 68 has a longitudinal bore 72 extending throughout its entire length to receive the outer free end portion 74 of a tool bar, tension adjusting rod 76, which is enlarged and apertured at its opposite end 78 to receive a bolt 80 which is inserted through suitable openings in the top ends 82 of a pair of clamping members 84 so that the rod 76 can pivot about the bolt 80. The clamping members 84 are apertured at the bottom portion thereof to receive a second bolt 86. This arrangement allows the clamping members 84 and the ends 78 of the bar 76 to be selectively positioned along the length of the chisel plow 16 thus allowing the tool bar adjusting rod 76 to position the tool bar 60 at various angular positions within the bearing 40 by rotating the yoke 50 in the directions of the arrows A and a' in FIGURE 1, for a purpose to be described later.

Selectively positioned on the rod 76 between the block 68 and a slidable collar 90 is a tension spring 88 retained by means of the slidable collar 90 which has an angularly extending bore 92 therethrough to provide sharp edges 96 which frictionally engage the rod 76 until forcibly released by pushing or pulling downwardly on an integral lip 94 of the collar 90 to disengage the leading edges 96 of the bore 92 of the slidable collar 90 from the rod 76 thereby permitting positioning of the collar 90 along the length of the tool rod 76 for adjusting the tension of the spring 88.

The outer end 89 of the spring 88 bears against the block 68 and the inner end 89a of the spring bears against the collar 90. A cotter pin 76a extends through the portion 74 of the rod 76 to prevent escape of the rod 76 from the block 68.

Referring now particularly to FIGURES 2, 3 and 7 of the drawings, there are positioned at determined intervals along the length of the tool bar 60 a plurality of harrow implements generally indicated at 100, each comprised of a spring metal tine or tooth 102 having an integral spring coil or loop 104 formed therein, the upper end portion 102a of each tooth adjacent the loop 104 is slidably received in a tooth holder 106 comprising a tube 108 or seat welded to a curve retaining plate 110. Disposed below the lower end of the tube 108 is an eyebolt 116, and disposed above the upper end of the tube 108 is a second eyebolt 124. The upper end portion 102a of the tooth is slidably and adjustably received through the openings in the eyebolts. Slidably received on the threaded ends of the eyebolts 116 and 124 is a steel plate 126 having a second curved retaining plate 128 welded thereto and provided with a serrated or roughened inner surface 130 for a positive frictional engagement with the tool bar 60. Curved plates 110 and 128 are held in frictional engagement with the tool bar 60 by means of a pair of lock nuts 132 which are received by the threaded ends of the eye bolts 116 and 124 with lock washers 134 disposed between the plate 126 and the nuts 132. When the lock nuts 132 are tightened against the plate 126, the eyebolts will draw the portion 102a of the tooth into wedging or binding engagement against the seat or channel of the tube 108 to hold the tooth rigidly in its adjusted position.

In operation, as the cultivator with the harrow implements 100 mounted thereon moves forwardly in the direction of the arrow C in FIGURE 1, the chisel plow engages substantially solid earth B and breaks the earth up in the same manner as any plow of this type. As the cultivator continues to move forwardly under normal operation the resilient metal tines 102 scrape slightly under the surface of the soil tending to spread the straw or trash, and fertilizer or weeds displaced by the chisel plow 12 along the surface of the earth. As the plow and harrow continue forwardly in the event one of the teeth 102 strikes a stone or other solid object or obstacle D directly in its path the spring loop 104' allows the tooth 102 to flex rearwardly locally, that is, that portion of the tooth including the loop and the portion of the loop extending downwardly from the loop through the free end of the tooth and pass over the object.

In the event the obstacle D encountered by the tooth 102 is of such a size that the elasticity of the loop 104 is not sufficient to permit the tooth being deflected rearwardly far enough to pass over the obstacle, a movement of translation will be imparted to the entire tooth. The tooth will in turn rotate the tool bar 60 in a clockwise direction and thereby move the yoke 50 in the direction of the arrow A' in FIGURE 1 of the drawing against the action of the spring 88. When the tooth has passed over the obstacle the spring 88, acting on the block 68, will rotate the yoke and the tool bar 60 in the opposite direction, that is, in the direction of the arrow A of FIGURE 1 to cause a movement of translation of the tooth 102 in the direction of the arrow A' and return the tooth 102 to its original position. It is thus apparent that the loop 104 will permit the tooth to accommodate the tooth to a small obstacle in its path or to initiate the accommodation of the tooth to large obstacles and the subsequent movement of translation of the entire tooth will cause rotation of the tool bar 60 and yoke 50 against the resilient action of the spring 88 to build up increased tension in the spring so that when the obstacle is passed over by the tooth, the spring 88 through the block 68 will rotate the yoke 50, tool bar 60 and the tooth to its original position.

Should the tooth 102 strike the object D a glancing blow the inherent resiliency in the tooth 102 will allow the tooth to be deflected sidewise from its path of forward travel, as shown in full lines to the dotted line position in FIGURE 2.

If for any reason, for example, in the event that the earth of the field being worked is more solid, harder or drier, it is decided to decrease the pressure or extent to which the working end of the teeth 102 engage such earth the operator can vertically reposition the teeth by loosening the nuts 132 and raise the teeth 102 by pulling the portions 102a thereof upwardly through the tube 108 to the desired height and retightening the nuts 132 to cause the eyebolts to again bind the portion 102a of the tooth against the tube 108. If it is desired to lower the teeth 102, the nuts 132 are loosened and the teeth lowered the desired amount and the nuts 132 again tightened.

In order to change the angle of attack of the working end of the teeth 102 with respect to the earth B, the tooth holder 106 will be attached to the tool bar 60 in any desired angular position. Since the plow shank 16 is curved the various adjustments of the holder 106 along the shank 16 will change the angle of attack of the working end of the tooth. Once the angle of attack has been determined it may be necessary to adjust the height of the teeth 102, as described above, so that there is a cooperation between the need for adjusting the angle of attack and the vertical adjustment of the teeth.

Of course, while the device of the present invention is shown applied to one chisel plow shank, it is understood that a tool bar 60 can be mounted on each chisel plow shank on the cultivator and as many teeth 102 as desired can be mounted on each tool bar 60.

A modified form of the invention is shown in FIGURES 8 to 12 wherein many of the parts thereof are similar to those of the first form of the invention shown in FIGURES 1 to 7, and where this is true, the reference characters used in the first form have been primed in the disclosure of the instant modified form.

Referring now to the modified form of FIGURES 8–12 only one of a plurality of harrow implement assembly 10′ is illustrated, said harrow implement assembly comprising a conventional chisel plow 12′ attached by bolts 14′ to a chisel plow shank 16′ having a pair of short angle irons 22′ of the same width as the chisel plow 16′ welded thereto to be received by a conventional rectangular angle iron frame 24′ as shown in FIGURE 8, and attached thereto by means of bolts 26′ and 28′. The frame 24′ is in turn attached in the conventional manner to the conventional draw bar mechanism and hydraulic lift mechanism, not shown, of any suitable tractor.

Considering FIGURES 9 and 11 of the drawings, a tool bar mounting means or assembly designated 140 is adjustably anchored to the chisel plow shank 16′ by means of a pair of U-bolts 141 each of which straddles the shank with its free ends passing through and detachably clamped to a plate 32′ by nuts 142. Through tightening nuts 142 both the anchor bolts 141 and the top plate 32′ are secured frictionally tight against the opposite surfaces of the plow shank 16′ thereby setting up a wedge-type clamping of the tool bar mounting means at a predetermined position on the plow shank 16′.

A tool mounting element 60′, which may be a bar, rod, pipe or the like and hereinafter referred to as a tool bar, has the required number of the plates 140 rigid therewith as by means of welds at 143 according to the number of assemblies 10′ which are employed.

Dealing particularly with FIGURES 8 and 9 of the drawings, and as in the first form of the invention, there are positioned at determined intervals along the length of the tool bar 60′ a plurality of harrow implements generally indicated at 100′, each comprised of a spring metal tine or tooth 102′ having an integral spring coil or loop 104′ formed therein, the upper end portion 102b of each tooth adjacent the loop 104′ is slidably received in a tooth holder 106′ comprising an open tube providing an opening, longitudinal seat or channel 108′, although the seat may be a tube 108 like in the first form of the invention, welded to a curved retaining plate 110′. Disposed below the lower end of the seat 108′ is an eye-bolt 116′, and disposed above the upper end of the seat 108′ is a second eye-bolt 124′. The upper end portion 102b of the tooth 102′ is slidably and adjustably received through the openings in the eye-bolts. Slidably received on the threaded ends of the eye-bolts 116′ and 124′ is a steel plate 126′ having a second retaining plate 128′ integral or welded thereto and provided with a concave serrated inner surface 130′ (FIGURE 12) for a positive frictional engagement with the tool bar 60′. Plates 110′, 128′ at their curved surfaces are held in tight frictional engagement with the tool bar 60′ by means of a pair of lock nuts 132′ which are received by the threaded ends of the eye-bolts 116′ and 124′ with locked washers 134′ disposed between the plate 126′ and the nuts 132′. When the lock nuts 132′ are tightened against the plate 126′, the eye-bolts will draw the portion 102′ of the tooth into wedging or binding engagement against the seat or channel of the tube 108′ to hold the tooth rigidly in its adjusted position.

In operation, as the cultivator with the harrow implements 110′ mounted thereon moves forwardly in the direction of the arrow C′ in FIGURE 8, the chisel plow engages a substantially solid earth B′ and breaks the earth up in the same manner as any plow of this type. As the cultivator continues to move forwardly under normal operation the resilient metal tines 102′ scrape slightly under the surface of the soil tending to spread the straw or trash, and fertilizer or weeds displaced by the chisel plow 12′ along the surface of the earth. As the plow and harrow continue forwardly in the event one of the teeth 102′ strikes a stone or other solid object or obstacle D′ directly in its path, the spring loop 104′ allows the tooth 102′ to flex rearwardly locally, that is, that portion of the tooth including the loop and the portion of the loop extending downwardly from this loop through the free end of the tooth and pass over the object.

It will be realized that this modified form or structure is adjustable and operates as in the first form, for instance, to enable the teeth 102′ to be deflected sidewise, to vertically position the teeth, to change the angle of attack of the working ends of the teeth 102′.

It will be realized that the structure is adjustable and operates as in the first form as for instance to enable the teeth 102′ to be deflected sidewise, to vertically position the teeth to change the angle of attack of the working ends of the teeth 102′.

It will be understood, of course, that although I have not illustrated in the form of FIGURES 8–12 the tool bar 16′ as rotatable relative to the plow shank 16′, such tool bar if preferred can be incorporated into the second form of the structure in association with the yoke 50, tensioning and adjustment means 76, 78, 84 and associated parts as in the first form of the invention, if desired.

Coming now to the further modified form of the invention which is illustrated in FIGURES 13 and 14, provision is made for its practice if a unitary assembly consisting of a plurality of tool bars here designated 60″ adapted to mount harrow implement assemblies such as 10 or 10′. Usually two (although I may use more) of the tool bars 60″ are employed in unitary relation as shown spaced apart, preferably parallel, and being for instance parts of a frame 150 in which they are connected by suitable spacing bars 151 usually welded at 152 to the ends of the tool bars.

Said unitary assembly of tool bars is adjustably fastened along the convexly curved portion of the heavy duty cultivator shank 153 corresponding to the shanks 16 and 16′ of the first two forms of the invention, respectively.

Welded or otherwise fastened at 151′ to one of the tool bars 62′, preferably midway of its ends, is a mounting plate 154 (FIGURES 13 and 14) which is adjustably anchored on the convex surface of the cultivator shank 153 by means of a pair of U-bolts 155 each straddling such shank with their free ends passing through and detachably clamped to plate 154 by nuts 156.

On either or all of the tool bars 60′ harrow implement assemblies such as those employed at 102 and 102′ but here designated 157, are adjustably secured at desired intervals. Such assemblies 157 as shown are identical with those employed in the form of FIGURES 8–11 and conveniently, like parts thereof in the form of FIGURES 8–11 are identified by the same reference numerals.

Still another modified form of the invention is illustrated in FIGURES 15–17 which employs a unitary assembly of tool bars and harrow teeth assembly substantially as in FIGURES 13 and 14. A conventional chisel plow shank like in the previous forms of my invention or any equivalent tillage implement is fragmentarily shown at 158 and one or more suitable anchor plate means 159 is adjustably clamped to said shank 158 as by means of U-shaped bolts 160 similar to the anchoring of the previously mentioned plate 154. Rigidly secured on each plate 159 is a horizontal sleeve or bearing 161.

In this form of the invention a unitary assembly of tool bars may be used, such bars being part of a frame 150′ which is equivalent to that shown at 150 in the form of FIGURES 13 and 14 but differing from the latter only in having anchor lugs 162 on its outermost tool bar 163, the spacer elements 164 connecting the innermost tool bar 165 thereto, optionally located inwardly of the ends of the tool bars.

On the tool bars 163 and 165 the desired number of teeth or harrow implement assemblies 172, for instance, like those described and detailed at 157 of the form of FIGURES 13 and 14 may be adjustably clamped.

Said tool bar 165 is journaled in the sleeve bearing 161 so that frame 150' and implement assemblies thereon may have a limited vertical swinging movement from the axis of the bearing 161. A standard 167 is welded to each bearing 161 and in a space adjacent the upper end of each standard, a guide block 168 is swiveled to the standard as by trunnions 169. An angularly disposed rod 170 is pivoted on a horizontal axis to lugs 162 and the free end of the rod extends slidably through the guide block 168. A compression spring 171 is mounted on the rod 170 as shown to coact with the lug 162 and guide block 168 to normally bias the frame 150' to and maintain the same and implement assemblies in soil-engaging operative position, but so as to permit upward yielding or swinging of such frame 150' and tool assemblies 172 therewith upon striking an obstruction. This form of the invention places the biasing or pressure spring means 170–171 back instead of ahead as in the first form of the invention.

It will be realized that all advantages of all the forms of my invention are obtained by the instant one, noting particularly that in the event an obstacle encountered by the tooth such as 102', for instance, is of such a size that the elasticity of the loop 104' is not sufficient to permit the tooth being deflected rearwardly far enough to pass over the obstacle, a movement of translation will be imparted to the entire tooth. The tooth will in turn rotate tool bar frame 150' and assemblies thereon in a clockwise direction and accordingly against the action of the spring 171. When the tooth has passed over the obstacle the springs 171 will rotate the frame 150' and assemblies in the opposite direction. It is thus apparent that the loop 104' will permit the tooth to accommodate the tooth to a small obstacle in its path or to initiate the accommodation of the tooth to large obstacles and the subsequent of translation of the entire tooth will cause rotation of the frame 150' and assemblies against the resilient action of the springs 171 to build up increased tension in the springs so that when the obstacle is passed over by the tooth, the springs 171 will rotate the frame 150' and assemblies to the normal original position.

Attention is called to the fact that in all forms of my invention the depending portions of cultivator shanks such as 16, 16', 153 and 158 are generally arcuate or so curved whereby attachment of the tool bars 60, 60', 60", 163 and 165 selectively in different positions therealong, effects movement of such tool bars and harrow implement assemblies carried thereby in the path of an arc or curve whose centers are those of the arcs or curves of the shanks to afford minute adjustment of both the height and angle of attack of the harrow tooth assemblies.

It is obvious that various further changes and modifications may be made in the details of construction and design of the above specifically described embodiments of this invention without departing from the spirit thereof, such changes and modifications being restricted only by the scope of the following claims:

I claim:

1. For use with a chisel plow mounted on a chisel plow shank, a harrow device comprising a tool bar, means adapted for rotatably mounting the tool bar on the chisel plow shank, at least one harrow tooth, means for mounting the tooth on said tool bar, resilient means adapted to be mounted on the chisel plow shank and operatively connected to said tooth to hold the tooth resiliently in contact with the earth to be worked but to permit deflection of the tooth by an obstacle encountered by the tooth to allow the tooth to pass over the obstacle without damage to the tooth, said means for mounting the tooth on said tool bar comprises a tooth holder on the tool bar, cooperating means on the tooth holder and the tooth for retaining the tooth in a preselected vertical position, said tooth being provided with an earth engaging working end portion and an end portion opposite to said working end portion, said tool holder comprising a tubular member through which the opposite end portion of the tooth extends, means engaging said opposite end portion of the tooth for wedging said opposite end portion against tubular member, a pair of eyebolts through the eyes of which the opposite end portion of the tooth extends, a first retaining plate on said tubular member, a flat plate having an aperture adjacent each end thereof through which the eyebolts extend, a second retaining plate on said flat plate, said retaining plates having a shape conforming to the shape of the tool bar for firmly gripping opposite faces of the bar, and locking means received by the extended end of the eyebolts and bearing against the flat plate to hold the retaining plates in tight frictional engagement with the tool bar.

2. A harrow device as claimed in claim 1 wherein said retaining plates are angularly adjustable about the tool bar so that the angle of attack of the working end portion of the tooth can be changed and said locking means will hold the retaining plates in their angularly adjusted position.

3. A heavy duty cultivator having a heavy duty cultivator shank, a harrow device comprising a tool bar, means for rotatably mounting the tool bar on the heavy duty cultivator shank, at least one harrow tooth, means for mounting the tooth on said tool bar, and resilient means mounted on the shank and operatively connected to said tooth to hold the tooth resiliently in contact with the earth to be worked but to permit deflection of the tooth by an obstacle encountered by the tooth to allow the tooth to pass over the obstacle without damage to the tooth, said means for mounting the tooth on said tool bar comprising a tooth holder on the tool bar and co-operating means on the tooth holder and the tooth for retaining the tooth in a preselected vertical position, said tooth being of a substantially elongated shape and provided with an earth engaging working end portion and an end portion opposite to said working end portion, said tooth holder comprising a tubular member through which the opposite end portion of the tooth extends and means engaging said opposite end portion of the tooth for wedging said opposite end portion against said tubular member for retaining the tooth in its adjusted vertical position including an eyebolt adjacent each end of the tubular member and means on the eyebolts for drawing the eyebolts against the opposite end portion of the tooth to bind it against the tubular member.

4. A harrow device as claimed in claim 3, wherein said tooth is provided with a resilient loop to permit deflection of the working end portion of the tooth in the event the tooth encounters an obstacle so that the tooth can pass over the obstacle without damage to the tooth and said resilient means coming into play only when the obstacle is of such a size that the deflection permitted by said loop is not sufficient to permit the tooth to pass over the obstacle, said resilient means including a spring and a rotatable member connected to the tool bar and engaging the spring and rotated by the tooth and tool bar against the action of the spring so that the spring will return the rotatable member and the tooth to its original working position after the tooth has passed over the obstacle.

5. For the use with a chisel plow mounted on a chisel plow shank lower than the generally convex portion of the shank, a harrow device comprising a tool bar, means adapted to mount the tool bar on the chisel plow shank at selected positions with respect to the axis of said tool bar, at least one harrow tooth, means for mounting the tooth on said tool bar, means adapted to be mounted on the chisel plow shank so that said tooth will resiliently contact the earth to be worked but will permit deflection of the tooth by an obstacle encountered by the tooth to allow the tooth to pass over the obstacle without damage to the tooth, said means for mounting the tooth on said tool bar comprising a tooth holder on the tool bar, cooperating means on the tooth holder and the tooth for retaining the tooth in said preselected positions, said tooth being provided with an earth engaging working end portion and an end portion opposite to said working end portion, said tool holder comprising a seat member across which the opposite end portion of the tooth extends, means engaging said opposite end portion of the tooth for wedging said opposite end portion against said seat member, a pair of bolts engaging the opposite end portions of the tooth, a first retaining plate on said seat member, a plate having an aperture adjacent each end thereof through which the bolts extend, a retaining plate on said first plate, said retaining plates having a shape conforming to the shape of the tool bar for firmly gripping opposite faces of the bar, and locking means received by the extended ends of the bolts and bearing against the first plate to hold the same and retaining plates in tight frictional engagement with the tool bar.

6. A harrow device as claimed in claim 5, wherein said first plate and retaining plate are angularly adjustable about the tool bar so that the angle of attack of the working end portion of the tooth can be changed and said locking means will hold the said plates in their angularly adjusted position.

7. A heavy duty cultivator having a heavy duty cultivator shank, a harrow device comprising a tool bar structure, means to mount the tool bar structure on the heavy duty cultivator shank at selected positions with respect to the axes of said tool bar and structure, at least one harrow tooth, means for mounting the tooth on said tool bar structure, means mounted on the shank so that said tooth will resiliently contact the earth to be worked but will permit deflection of the tooth by an obstacle encountered by the tooth to allow the tooth to pass over the obstacle without damage to the tooth, said means for mounting the tooth on said tool bar structure comprising a tooth holder on the tool bar structure and cooperating means on the tooth holder and the tooth for retaining the tooth in said selected positions, said tooth being of a substantially elongated shape and provided with an earth engaging working end portion and an end portion opposite to said working end portion, said tooth holder comprising a seat member across which the opposite end portion of the tooth extends, and means engaging said opposite end portion of the tooth for wedging said opposite end portion against said seat member for retaining the tooth in its adjusted vertical position including bolts engaging and one adjacent each end of the seat member and means on the bolts for drawing the bolts against the opposite end portion of the tooth to bind it against the seat member.

8. A heavy duty cultivator according to claim 7 including bearing means attachable to the heavy duty cultivator shank in which said tool bar structure is journaled for limited swinging on an approximately horizontal axis, and means connected to said bearing means and to said tool bar structure including a spring to normally bias said tool bar structure into operative position.

9. A heavy duty cultivator according to claim 7 having a device movably connected to both said tool bar structure and said heavy duty cultivator shank to normally bias said tool bar structure in the operative position.

10. A heavy duty cultivator according to claim 7 having a bearing means attached to the heavy duty bearing shank in which said tool bar structure is journaled for limited swinging on an approximately horizontal axis, and means connected to said bearing means and to said tool bar structure including a spring to normally bias said tool bar structure into operative position, said tool bar structure including a frame one part of which is a tool bar, means journaling said tool bar, and said last mentioned means engaging said frame rearwardly of the axis of movement of said tool bar.

11. A heavy duty cultivator according to claim 7 wherein said tool bar structure is a frame having a plurality of tool bars one of which is journaled for yielding swinging movement.

12. A heavy duty cultivator according to claim 7 having bearing means attached to the heavy duty bearing shank, said tool bar being a frame including a tool bar member journaled in said bearing means for limited swinging on an approximately horizontal axis, a standard rising from said bearing means having a connection to said tool bar structure rearwardly of said standard to normally bias said tool bar structure into operative position.

13. A heavy duty cultivator according to claim 7 having bearing means attachable to the heavy duty cultivator shank, said tool bar being a frame including a tool bar member journaled in said bearing means for limited swinging on an approximately horizontal axis, a standard rising from said bearing means having a connection to said tool bar structure rearwardly of said standard to normally bias said tool bar structure into operative position.

14. A heavy duty cultivator according to claim 7 wherein said tool bar structure has a plurality of relatively parallel tool bars.

15. A heavy duty cultivator according to claim 7 including bearing means attachable to the heavy duty cultivator shank in which said tool bar structure is journaled for limited swinging on an approximately horizontal axis, means connected to said bearing means and to said tool bar structure including a spring to normally bias said tool bar structure into operative position, said tool bar structure being a frame one part of which is a tool bar element, means journaling said tool bar element in said part, and said last mentioned means engaging said frame rearwardly of the axis movement of said tool bar element.

References Cited
UNITED STATES PATENTS

| | | | |
|---|---|---|---|
| 331,358 | 12/1885 | Wood | 172—500 X |
| 413,274 | 10/1889 | Brown | 172—643 |
| 562,106 | 6/1896 | Wiard | 172—708 X |
| 738,364 | 9/1903 | Simonds et al. | 111—85 |
| 780,609 | 1/1905 | Hoffert | 172—165 |
| 2,136,851 | 11/1938 | Jess | 172—142 |
| 2,618,081 | 11/1952 | Sinner et al. | 172—200 X |
| 2,805,613 | 9/1957 | Siems | 172—643 |
| 3,100,018 | 8/1963 | Sokolowski | 172—198 X |

ABRAHAM G. STONE, Primary Examiner.

J. R. OAKS, Assistant Examiner.